United States Patent
Gabas Cebollero et al.

(10) Patent No.: US 6,263,756 B1
(45) Date of Patent: Jul. 24, 2001

(54) TERMINAL WITH FIXING DEVICE FOR CONTROL CABLES

(75) Inventors: Carlos Gabas Cebollero, Barcelona; Jordi Dalmau Riu, Terrassa, both of (ES)

(73) Assignee: Fico Cables, S.A., Barcelona (ES)

( * ) Notice: Subject to any disclaimer, the term of this patent is extended or adjusted under 35 U.S.C. 154(b) by 0 days.

(21) Appl. No.: 09/381,860

(22) PCT Filed: Mar. 13, 1998

(86) PCT No.: PCT/ES98/00064

§ 371 Date: Sep. 27, 1997

§ 102(e) Date: Sep. 27, 1999

(87) PCT Pub. No.: WO98/42990

PCT Pub. Date: Oct. 10, 1998

(30) Foreign Application Priority Data

Mar. 25, 1997 (ES) .................................................. 9700640

(51) Int. Cl.[7] ........................................................ F16C 1/10
(52) U.S. Cl. ................................... 74/502.4; 74/501.5 R; 74/502.6; 192/111 A
(58) Field of Search .................................. 74/500.5–502.6, 74/503, 504, 505; 192/111 R, 111 A; 403/104, 106, 110

(56) References Cited

U.S. PATENT DOCUMENTS

| 4,717,004 | * | 1/1988 | Hoyle | 192/111 A |
| 5,144,856 | * | 9/1992 | Roca | 74/501.5 R |
| 5,265,493 | * | 11/1993 | Solano et al. | 74/501.5 R |
| 5,383,377 | * | 1/1995 | Boike | 74/502 |
| 5,570,612 | * | 11/1996 | Reasoner | 74/502.6 |
| 5,823,063 | * | 10/1998 | Nagle et al. | 74/502.6 |
| 6,038,942 | * | 3/2000 | Gabas et al. | 74/500.5 |
| 6,105,458 | * | 8/2000 | Casas Gomila et al. | 74/502.4 |

FOREIGN PATENT DOCUMENTS

| 0 365 242 B1 | 4/1990 | (EP) | F16C/1/22 |
| 0 431 307 B1 | 6/1991 | (EP) | F16C/1/22 |
| 0 509 629 B1 | 10/1992 | (EP) | F16C/1/22 |
| 97/43553 | 11/1997 | (WO) | F16C/1/22 |

* cited by examiner

Primary Examiner—Vinh T. Luong
(74) Attorney, Agent, or Firm—Sughrue, Mion, Zinn, Macpeak & Seas, PLLC

(57) ABSTRACT

This terminal comprises a tubular portion (25) on which are coaxially arranged a fixing body (20) attached to the tubular portion (25) designed to receive a stem (12) fixed to one end (10) of steel cable (2) of a control cable (1), a fixing spring (21) and a closure body (19) which, driven by the spring (21), has rotation capacity between two positions, opening position and fixing position. The fixing body (20) and the stem (12) have respective screw-threaded retaining sections (47, 16), and the terminal (17) has a trigger (48) with capacity for sliding between two positions, an opening position and a locking position.

Applicable to the automobile industry.

3 Claims, 3 Drawing Sheets

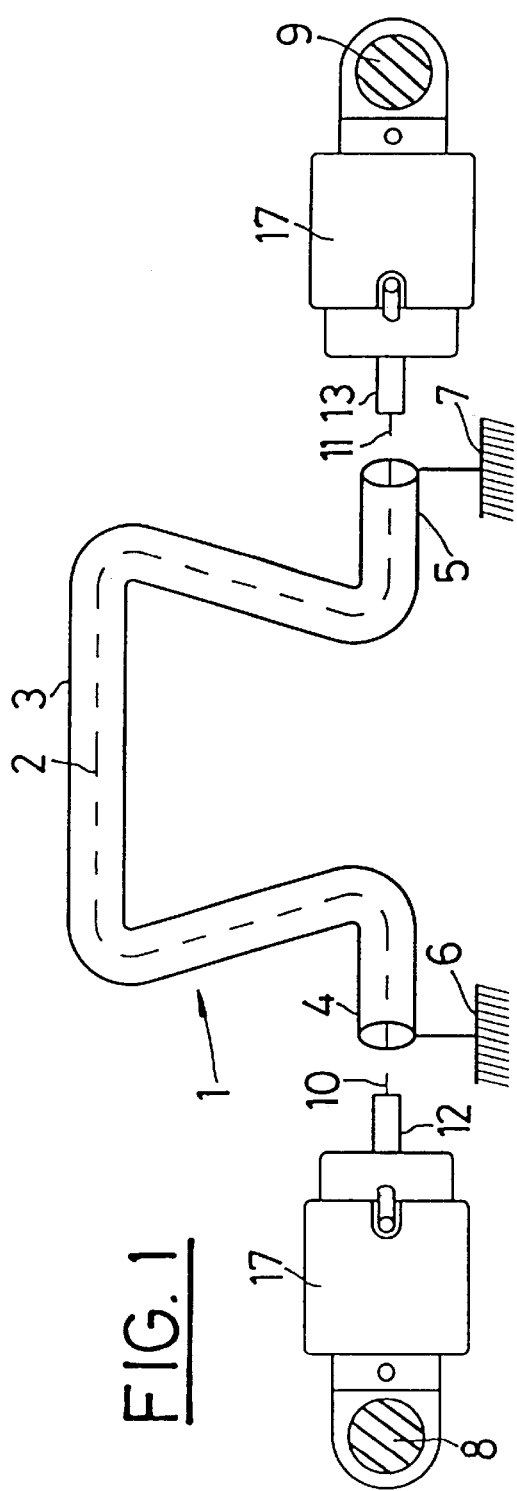
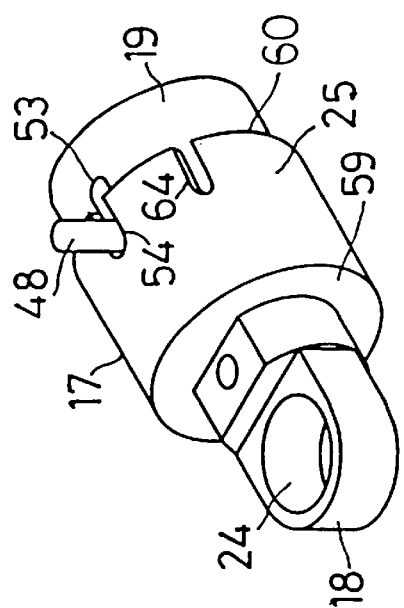

TERMINAL WITH FIXING DEVICE FOR CONTROL CABLES

TECHNICAL FIELD OF THE INVENTION

The object of the invention is a terminal with fixing device for control cables, which is applicable to control cables made up of a sheathed steel cable of the type habitually used in the automobile industry as a linking element between an actuating control and an actuated mechanism, known as "push-pull" actuating cables.

BACKGROUND OF THE INVENTION

Known in the art is a very extensive variety of embodiments of control cables with "push-pull" actuation. Such control cables essentially comprise a steel cable provided with a sheath in which the steel cable has with respect to the sheath capacity to slide in both directions. In general, the ends of the steel cable include a respective steel cable terminal designed for attachment to said actuating control and actuated mechanism, such as the gear-shift lever provided in the vehicle driving compartment and the corresponding gear-shift mechanism. The ends of the control cable sheath are generally fixed to the structure of the automobile vehicle at functionally suitable points along the route of the control cable, said fixing being implemented by means of sheath terminals. It is known that, in addition to said steel cable and sheath terminals, the control cable can further include a self-adjusting or self-regulating device of the length of the sheathed portion of steel cable, the purpose of that device being to take up any distance tolerances which each particular vehicle has between said actuating control and actuated mechanism.

The control cables such as those described are supplied ex-works incorporating all the elements necessary for fitting thereof onto the automobile vehicle; that is, incorporating said steel cable and sheath terminals and, where necessary, said self-adjusting or self-regulating device. Under certain circumstances, arising for example due to considerable length of the control cable, or due to the conditions under which the control cable is fitted onto the vehicle so requiring, the fact that the steel cable terminal or terminals are fixed non-removably to the steel cable involves considerable difficulty and, therefore, increases the costs deriving from fitting the control cable on the vehicle.

The patent document DE-U-93,04,462 describes a terminal provided with a fixing device which comprises a tubular portion and a fixing body axially arranged. The fixing body is adapted to receive a stem fixed to one end of the steel cable of a control cable, said fixing body and stem being able to couple to each other. Superposed on said tubular portion, there is a closure body which, by sliding over said tubular portion and over the fixing body, produces the coupling between the fixing body and the stem, leaving the stem fixed to the terminal. The device according to DE-U-93,462 has the drawback that the fixing body could slide inadvertently, which would release the stem, with the consequent loss of effectiveness of the control cable.

The patent document U.S. Pat. No. 5,156,064 describes a cable length adjustment device, which comprises a fixing body adapted to receive a stem fixed to a cable. The fixing body and the stem are coupled to each other by means of respective fixing thread with a mutual engagement by manual rotation of the fixing body, the position of the fixing body being terminated by a blocking pin. The device according to U.S. Pat. No. 5,156,064 has the drawback that it requires manual operation of the fixing body and of the blocking pin, which increases the mounting cost.

DESCRIPTION OF THE INVENTION

A terminal with fixing device for control cables of new structure and operation is made known herein in order to provide a solution to the aforesaid disadvantages presented by the known embodiments of control cables which incorporate non-removable steel cable terminals.

The terminal with fixing device for control cable object of the invention comprises a terminal body provided with means for coupling thereof to an actuating control or to an actuated mechanism, the fixing device comprising:

in the terminal body, an axially arranged tubular portion;

a tubular closure body coaxially arranged with respect to the tubular portion, which is able to move between two positions, opening position and fixing position respectively;

a tubular fixing body coaxially arranged with respect to the closure body and fixed to the tubular portion, which fixing body is adapted to receive a stem axially fixed to one end of the steel cable of a control cable;

the closure body, the fixing body and the stem having respective and complementary fixing means that are able to couple to each other and adapted in such a way that, by sliding the closure body from the opening position to the fixing position, the closure body actuates on the fixing body and this one, in turn, actuates on the stem, producing the coupling of the fixing means and leaving the stem fixed to the terminal; characterized in that:

the closure body and the fixing body are received in the tubular portion of the terminal body;

the closure body is able to rotate in both directions between the two positions, opening position and fixing position;

the closure body and the tubular portion have respective and complementary positioning means which determine the opening and the fixing positions of the closure body;

coaxially arranged between the tubular portion and the closure body, there is a fixing spring which works permanently under torsion, having one of its ends fixed to the tubular portion and its other end fixed to the closure body, in such a way that the fixing spring permanently imparts to the closure body a rotating action from the opening position to the fixing position; and in that the action imparted to the positioning means produces, by resilient reaction of the fixing spring, the rotation of the closure body from the opening position to the fixing position, leaving the stem fixed to the terminal.

The fixing means include:

on the fixing body, a plurality of equal axial fixing extensions, preferably three in number, and regularly distributed, which, in the absence of exterior action, present by elastic reaction a conical arrangement designed to receive the stem, with each of said axial fixing extensions having a threaded retaining section;

on the stem, a threaded retaining section which coincides with that of the axial fixing extensions;

on the closure body, a plurality of radial closure extensions arranged to coincide with the axial fixing extensions and so designed that rotation of the closure body from the opening position to the fixing position gives rise to superimposition of the corresponding radial closure extensions on the axial fixing extensions, causing them to draw towards each other in such a way that when the stem is in the fixing body the threaded retaining sections of the axial fixing extensions and of the stem mesh onto each other.

The positioning means include:

on the closure body, an axial cavity designed to receive a trigger which can be actuated from the exterior and a thrust spring, axially arranged, which trigger can slide in both directions between two positions, a locking position and an opening position respectively, while the thrust spring works permanently under compression with one of its ends resting against the closure body and its other end against the trigger, in such a way that the latter is subjected permanently to an action directed from the opening position to the locking position;

on the tubular portion of the terminal body, two axially arranged slots, an opening slot and a fixing slot respectively, designed to receive the trigger, and two guide-slots designed to receive corresponding guide-projections of the closure body;

on the fixing body, a perimetral positioning projection so arranged that the closure body is situated between said projection and the terminal body, all of this so designed that movement of the trigger from the locking position to the opening position, by sliding through the opening slot: and subjecting the thrust spring to greater compression, produces rotation of the closure body from the opening position to the fixing position, in which the reaction of the thrust spring moves the trigger in the fixing slot, leaving the position of the closure body fixed.

The above-described characteristics of the terminal with fixing device of the invention thus provides a solution for the disadvantages presented by the known embodiments of control cables on which the steel cable ends incorporate non-removable terminals. Indeed, the terminal of the invention can be supplied ex-works with the closure body in the opening position, in which situation the terminal can be fitted onto the vehicle independently of the control cable as such. Once the terminal of the invention and the control cable have been mounted on the vehicle, attachment only requires insertion of the stem fixed to the corresponding end of the steel cable into the fixing body of the terminal, and then moving the trigger fitted in the opening slot of the tubular portion of the terminal body from the locking position to the opening position, producing by rotation of the closure body the meshing of the threaded retaining sections of the fixing body and of the stem, thereby leaving the control cable and the terminal of the invention attached.

In addition to all the foregoing relating to operation of the terminal of the invention, it can be understood that the terminal can be supplied ex-works fixed to the stem of the corresponding end of the steel cable of the control cable, the closure body in this case being in the fixing position and locked in position by the action of the trigger which occupies the fixing slot of the tubular portion of the terminal body.

Detachment of the stem from the terminal simply requires movement of the trigger arranged in the fixing slot from the locking position to the opening position, at the same time as a rotation movement is imparted to the closure body in a direction from the fixing position to the opening position, in which the action of the thrust spring situates the trigger in the locking position of the opening slot, from which moment it is possible to detach the stem from the terminal, leaving the terminal arranged for attachment to the stem again in the manner described above.

BRIEF DESCRIPTION OF THE DRAWINGS

The drawing sheets of the present specification show the terminal with fixing device of the invention for control cables. In said drawings:

FIG. 1 is a schematic view of a control cable incorporating the terminal of the invention;

FIG. 2 is a perspective view of the terminal of the invention;

DETAILED DESCRIPTION OF THE EXAMPLE OF EMBODIMENT

Figure 3:
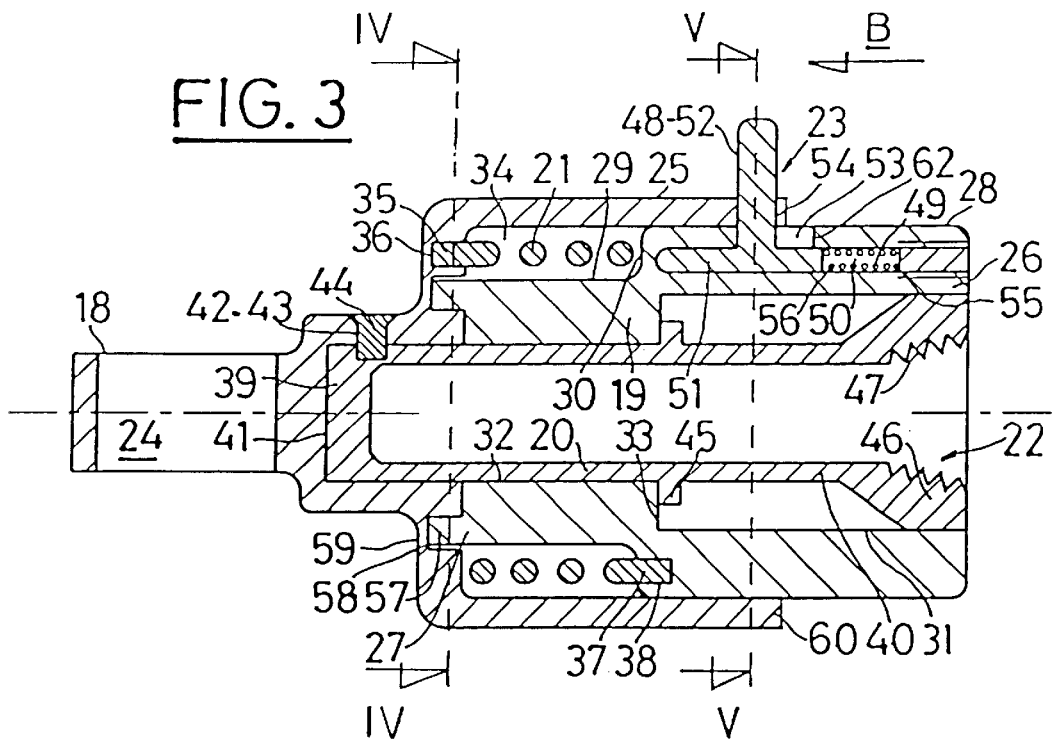
FIG. 3 is a longitudinal cross-section view of the terminal with its closure body in the opening position.

FIG. 1 shows schematically a control cable 1 which includes a steel cable 2 and a sheath 3. The ends 4 and 5 of the sheath 3 are attached to respective fixed points 6, 7 of the structure of the vehicle and at those functionally suitable points along the route of the control cable 1 between an actuating control 8 and an actuated mechanism 9, shown by means of a shaded circular area representing a corresponding attachment spindle. The ends 10 and 11 of the steel cable 2 are fixed to stems 12 and 13 respectively, one of which, the one marked with reference number 12, is shown in detail in FIG. 6. The stem 12 is of generally long cylindrical shape and has at one of its ends, the interior end 14, an axial orifice 15 to which is fixed said end 10 of the steel cable 2 and a threaded retaining section 16. FIG. 1 shows how the actuating control 8 is attached to the terminal of the invention marked with reference number 17, to which the stem 12 is also fixed; similarly, another terminal 17 of the invention is attached to the actuated mechanism 9, while the stem 13 is in turn also attached to that terminal 17. The arrangement of the control cable 1 shown in FIG. 1 is given solely by way of example of application of the terminal 17 of the invention; it can be understood that the control cable 1 can be arranged in any other different way without this affecting the essential nature of the invention, so that the control cable 1 could, for example, incorporate an adjusting device, not shown, for adjusting the length of the sheathed portion of steel cable 2, 3.

Figure 6:
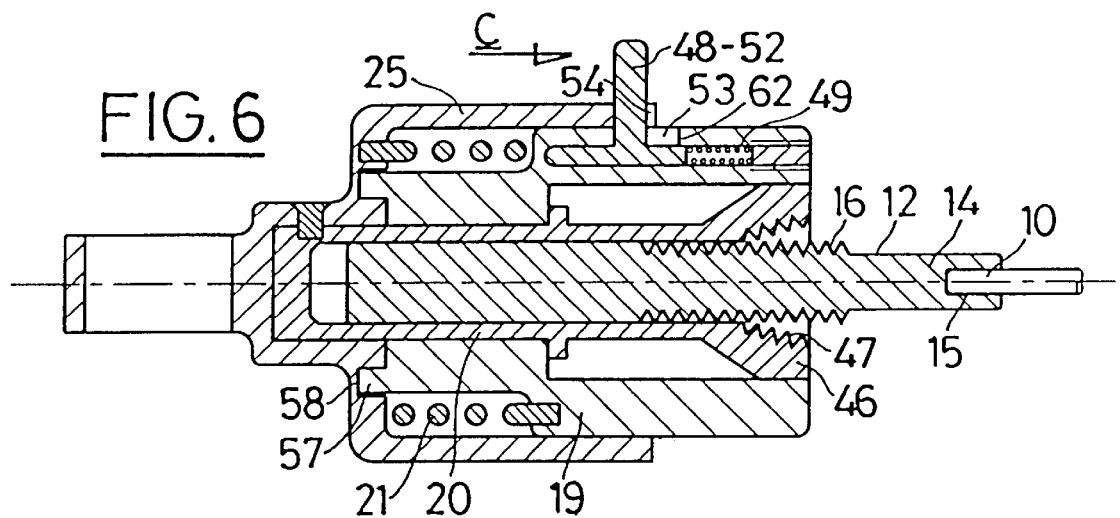
FIG. 6 is a longitudinal cross-section view of the terminal of the invention prior to attachment of a stem.
Figure 7:
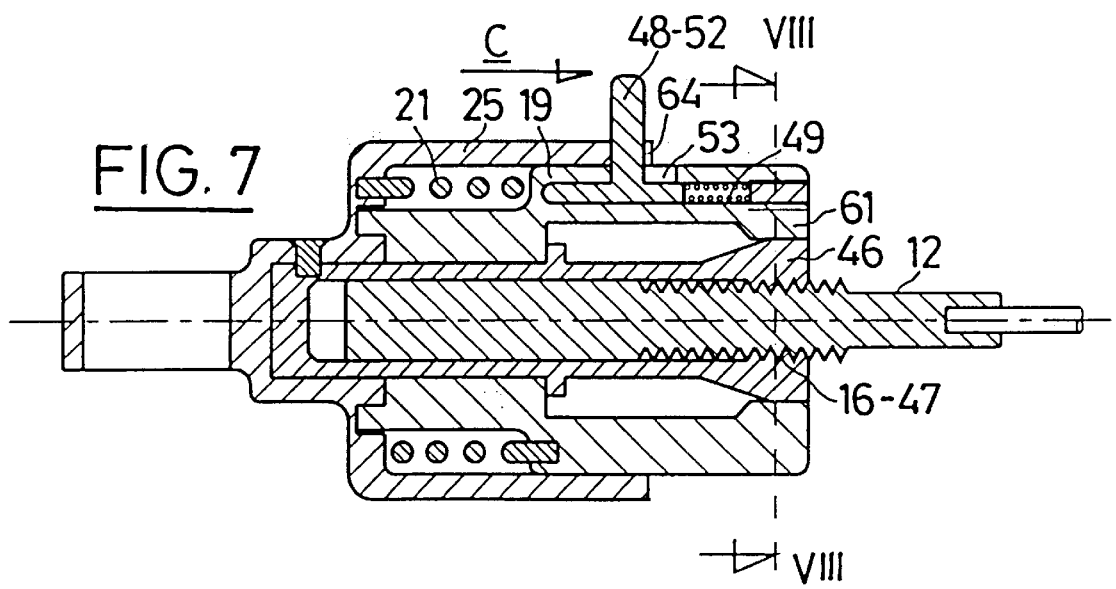
FIG. 7 is a longitudinal cross-section of the terminal of the invention with a stem fixed to it.
Figure 8:
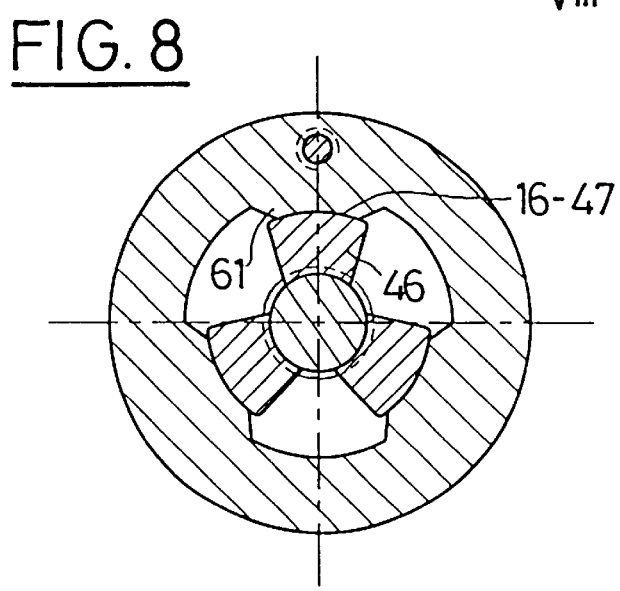
FIG. 8 is a view corresponding to section VIII—VIII of FIG. 7.

In the following description of the example of embodiment of the terminal 17 of the invention reference is made to FIGS. 2 to 5, while FIGS. 6 to 8 bear the reference numbers mentioned in the description of operation of the cable 17.

FIG. 3 shows how the terminal 17 of the invention includes a terminal body 18, a closure body 19, a fixing body 20, a fixing spring 21, fixing means 22 and positioning means 23.

FIGS. 2 and 3 show how the terminal body 18 includes, for coupling thereof with the actuating control 8 or with the actuated mechanism 9, a through-orifice 24 and a tubular portion 25 on which can be distinguished an exterior end 59 and an open interior end 60, of dimensions such as to receive the closure 19 and fixing 20 bodies.

Figure 5:
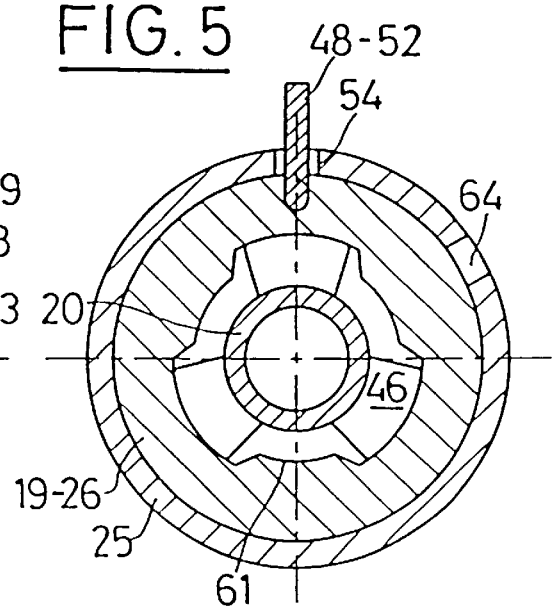
FIG. 5 is a view corresponding to section V—V of FIG. 3.

FIGS. 3 and 5 show how the closure body 19 is of generally tubular shape open at both its ends, interior 26 and exterior 27 respectively. To the exterior are two portions of different diameters, the interior portion 28 and exterior portion 29 of smaller diameter, respectively, linked by means of a step 30, while to the interior are another two portions of different diameters, the interior portion 31 and exterior portion 32 of smaller diameter, respectively, linked by means of a step 33, the exterior portion 32 being designed to receive the fixing body 20 with a snug fit. Once the tubular portion 25 and the closure body 19 have been attached to each other, the exterior portion 29 of the closure body 19 defines a cavity 34 for the fixing spring 21 which is coaxially arranged with respect to the closure body 19.

The fixing spring 21 works permanently under torsion. One of its ends, the exterior end 35, is arranged with a snug fit in a cavity 36 of the exterior end 59 of the tubular portion 25, while its other end, the interior end 37, is arranged with a snug fit in a cavity 38 in the step 30 of the closure body 19. The fixing spring 21 thus permanently exercises upon the closure body 19 a rotating action in the direction marked A in FIG. 4.

Figure 4:
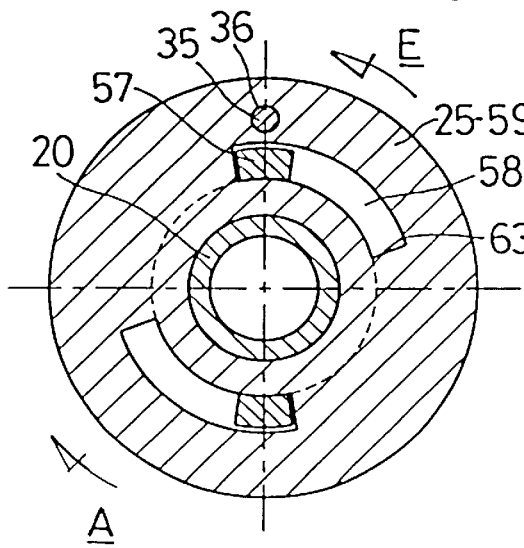
FIG. 4 is a view corresponding to section IV—IV of FIG. 3.

FIGS. 3, 4 and 5 show how the fixing body 20 is of generally tubular shape closed at one of its ends, the exterior end 39, and open at its other end, the interior end 40. The exterior end 39 is-housed with a snug fit in a cavity 41 in the exterior end 59 of the tubular portion 25, the exterior end 59 having a through-orifice 42 which leads into said cavity 41 provided with a screw-threaded section 43 into which is threaded a bolt 44, leaving the fixing body 20 and the tubular portion 25 fixed to each other. The fixing body 20 has a perimetral projection 45 which rests on the step 33 of the closure body 19, whose purpose is to prevent the closure body 19 from sliding axially.

FIGS. 3 and 5 show how the fixing means 22 include the following elements. On the interior end 40 of the fixing body 20, three equal and regularly distributed axial fixing extensions 46 which, in the absence of any action, press elastically on the interior portion 31 of the closure body 19, while the fixing extensions 46 adopt a conical arrangement, with their larger base oriented to the exterior, designed in this situation to receive the stem 12 as shown in FIG. 6, while each of the fixing extensions 46 has a threaded retaining section 47 which coincides with that of the stem 12. And, on the interior portion 31 of the closure body 19, three radial closure extensions 61 which, as shown in FIG. 5, are arranged between the axial fixing extensions 46.

As shown in FIGS. 3, 4 and 5, the positioning means 23 have the elements detailed below. A generally T-shaped trigger 48 and a thrust spring 49 arranged in an axial cavity 50 in the interior end 26 of the closure body 19. The arms 51 of the trigger 48 are situated in the axial cavity 50, and its body 52 traverses an axial slot 53 of the closure body 19 and an axial opening slot 54 in the tubular portion 25, as shown in perspective in FIG. 2, and the thrust spring 49 works permanently under compression with one of its ends, the interior end 55, resting against the closure body 19 and its other end the exterior end 56, resting against the arms 51 of the trigger 48 upon which it permanently exercises an action in the direction marked B in FIG. 3, all this so designed that the trigger 48 can slide between a locking position, that shown in FIG. 3, and an opening position, not shown, in which the body 52 of the trigger 48 is in the bottom 62 of the slot 53 of the closure body 19 and to the exterior with respect to the tubular portion 25. And, as shown in FIGS. 3 and 4, on the exterior end 27 of the closure body 19, there are two guide-projections 57 diametrically opposite each other and housed in corresponding guide-slots 58 on the exterior end 59 of the tubular portion 25.

There follows a description of the operation of the terminal with fixing device of the invention for control cables.

The terminal 17 can be supplied ex-works as shown in FIG. 3. In this situation the body 52 of the trigger 48 is in the opening slot 54 of the tubular portion 25 and in the locking position, where it remains by the action of the thrust spring 49; the fixing spring 21 is compressed, exercising an action on the closure body 19 in the direction marked A in FIG. 4; and the axial fixing extensions 46 of the fixing body 20 adopt, by elastic reaction, a conical arrangement designed to receive the stem 12. The terminal 17 can be fitted in two ways. A first way consists in proceeding firstly to attach the terminal 17 to the actuating control 8 and then attaching the stem 12 to the terminal 17; a second way consists in the reverse procedure, that is, firstly attaching the stem 12 to the terminal 17 and then attaching the latter to the actuating control 8. In either of the two ways, attachment of the stem 12 to the terminal 17 simply requires the following operations to be carried out. Firstly, as shown in FIG. 6, the stem 12 is inserted into the fixing body 20. The body 52 of the trigger 48 is then pushed in the direction marked C and slides through the opening slot 54 of the closure body 19, which sliding movement continues until it reaches the bottom 62 of the slot 53, leaving the body 52 situated to the exterior of the tubular portion 25, in which situation the thrust spring 49 is subjected to greater compression by reduction of its length; the fixing spring 21 imparts to the closure body 19 rotation in the direction marked A in FIG. 4, which rotation is limited by the bottom 63 of the guide-slot 58 when reached by the guide-projections 57 of the closure body 19, or by the closure body 19 reaching the fixing position; the rotation of the closure body 19 causes superimposition of the radial closure extensions 61 on the axial fixing extensions 46 by bringing them together and leaving the threaded retaining sections 47, 16 of the fixing extensions 46 and of the stem 12, respectively, meshed together, as shown in FIGS. 7 and 8, and the stem 12 fixed to the terminal 17; and, simultaneously with fixing of the stem 12, the elastic reaction of the thrust spring 49 causes sliding of the body 52 of the trigger 48 from the opening position to the locking position through the slot 53 of the closure body 19 and a locking slot 64, shown in perspective in FIG. 2, arranged in the tubular portion 25, thereby leaving the position of the closure body 19 fixed with respect to that of the fixing body 20. Should the stem 12 have to be detached from the terminal 17, the user simply has to proceed as follows: firstly, move the trigger 48 in the direction marked C in FIG. 7 until the opening position is reached, submitting the thrust spring 49 to greater compression; the closure body 19 is then rotated in the direction marked E in FIG. 4, submitting the fixing spring 21 to greater compression; and finally, the elastic reaction of the thrust spring 49 situates the trigger 48 in the locking position in the opening slot, leaving the terminal 17 in the initial situation described above.

What is claimed is:

1. A terminal attachable to control cables, comprising:

a terminal body (18) attachable to an actuating device;

a tubular portion (25) connected to the terminal body;

a tubular closure body (19) coaxially arranged with respect to the tubular portion (25) and being rotatable between an opening portion and a fixing position;

a tubular fixing body (2) coaxially arranged with respect to the closure body (19) and fixed to the tubular portion (25), said fixing body (2) being adapted to receive a stem (12) axially fixed to one end (10) of a cable (2);

a fixing mechanism respectively provided on the closure body and the tubular portion for securing the stem to the terminal upon rotation of said closure body from said opening position to said fixing position;

positioning means for positioning the closure body with respect to the tubular portion (25) to define the opening and the fixing positions of the closure body (19);

a torsion spring coaxially arranged between the tubular portion (25) and the closure body (19), one end of said torsion spring (35) being fixed to the tubular portion (25) and the other end (37) of said torsion spring being fixed to the closure body (19), in such a way that the fixing spring (21) urges the closure body (19) from the opening position to the fixing position.

2. The terminal as claimed in claim 1 wherein the fixing means (22) includes:

on the fixing body (20), a plurality of axial fixing extensions (46) which in the absence of exterior action define by elastic reaction a conical opening designed to receive the stem (12), with each of said axial fixing extensions (46) having a threaded retaining section (47);

on the closure body (19), a plurality of radial closure extensions (61) arranged to coincide with the axial fixing extensions (46) and so designed that rotation of the closure body (19) from the opening position to the fixing position gives rise to superimposition of the corresponding radial closure extensions (61) on the axial fixing extensions (46), causing them to draw towards each other in such a way that when the stem (12) is in the fixing body (20) the threaded retaining sections (16, 47) of the axial fixing extensions (46) and of the stem (12) mesh onto each other.

3. A terminal as claimed in claims 1 and 2, wherein the positioning means (23) includes:

on the closure body (19), an axial cavity (50) designed to receive a trigger (48) which can be actuated from the exterior and a thrust spring (49), axially arranged, which trigger (48) can slide in both directions between the locking position and the opening position respectively, while the thrust spring (49) works permanently under compression with one of its ends resting against the closure body (19) and its other end against the trigger (48), in such a way that the latter is subjected permanently to an action directed from the opening position to the locking position;

on the tubular portion (25) of the terminal body (18), two axially arranged slots, an opening slot (54) and a fixing slot (64) respectively, designed to receive the trigger (48), and two guide-slots (58) designed to receive corresponding guide projections (59) of the closure body (19);

on the fixing body (20), a perimetral positioning projection (45) so arranged that the closure body (19) is situated between said projection (45) and the terminal body (18).

* * * * *